(12) United States Patent
Jacob et al.

(10) Patent No.: US 8,621,337 B1
(45) Date of Patent: Dec. 31, 2013

(54) DETECTING MEMORY CORRUPTION

(75) Inventors: Samuel Jacob, Bangalore (IN); Vijay Paul, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 433 days.

(21) Appl. No.: 12/894,521

(22) Filed: Sep. 30, 2010

(51) Int. Cl.
*G06F 11/00* (2006.01)

(52) U.S. Cl.
USPC .......................................... 714/811

(58) Field of Classification Search
USPC .......................................... 714/811
See application file for complete search history.

(56) References Cited

U.S. PATENT DOCUMENTS 6,237,786 B1 * 5/2001 Ginter et al. ................ 213/153

OTHER PUBLICATIONS

"FreeBSD The Power To Serve," www.freebsd.org/cgi/man.cgi?query=memguard@sektion=9. pp. 1-4, Aug. 2, 2010, FreeBSD 8.3.

* cited by examiner

*Primary Examiner* — Albert Decady
*Assistant Examiner* — Enam Ahmed
(74) *Attorney, Agent, or Firm* — Harrity & Harrity, LLP

(57) ABSTRACT

A device identifies, based on a program code instruction, an attempted write access operation to a fenced memory slab, where the fenced memory slab includes an alternating sequence of data buffers and guard buffers. The device assigns read-only protection to the fenced slab and invokes, based on the attempted write access operation, a page fault operation. When a faulting address of the attempted write operation is not an address for one of the multiple data buffers, the device performs a panic routine. When the faulting address of the attempted write operation is an address for one of the multiple data buffers, the device removes the read-only protection for the fenced slab and performs a single step processing routine for the program code instruction.

20 Claims, 9 Drawing Sheets

```
GEOM_LABEL: Label for provider ad0s1f is ufsid/4b6c7a4d499f5052.
947:(slab_zalloc)Fencing va 0xc3f75000 to c3f76000
947:(slab_zalloc)Fencing va 0xc3f76000 to c3f77000
947:(slab_zalloc)Fencing va 0xc3f77000 to c3f78000
947:(slab_zalloc)Fencing va 0xc3f78000 to c3f79000
947:(slab_zalloc)Fencing va 0xc3f7d000 to c3f7e000
947:(slab_zalloc)Fencing va 0xc3f7e000 to c3f7f000
947:(slab_zalloc)Fencing va 0xc3f7f000 to c3f78000
Trying to mount root from ufs:/dev/ad0s1a
WARNING: / was not properly dismounted
pcn0: link state changed to UP
Interface IP-Address Broadcast
Loading configuration files.
kernel dumps on /dev/ad0s1b
Entropy harvesting: interrupts ethernet point to point
257:(handle_mem_fence_fault)VA 0xc3f7d080 IP 0xc07828c5 Page off 128
panic: FENCE: Access to protected item
cpuid = 0
KDB: enter: panic
[thread pid 73 tid 100044 ]
Stopped at    kdb_enter_why+0*3a:  movl    $0,kdbwhy
db>
db>
db>
```

ACCESS TO INVALID ELEMENT CAUSES PANIC

Fig. 8

```
257:(handle_mem_fence_fault)VA 0xc3f7d080 IP 0xc07828c5 Page off 128
panic: FENCE: Access to protected item
cpuid = 0
KDB: enter: panic
[thread pid 73 tid 100044 ]
Stopped at    kdb_enter_why+0*3a: movl    $0,kdbwhy
db>
db>
db> bt
Tracing pid 73 tid 100044 td 0xc3f4d240
kdb_enter_why(c0825dc,c08256dc,c0840f79,c3b82a54,0,...) at kdb_enter_why+0*3a
panic(c0840f79,c3f7d080,c0840f79,c07828c5,80,2089aea0,...) at panic+0x136
trap(c3b82b04) at trap+0x1fd
calltrap() at calltrap+0x6
--- trap 0xc, eip = 0xc07828c5, esp = 0xc3b82b44, ebp = 0xc3b82b54 ---
syscctl_test_fence_alloc(c08b04c0,0,0,c3b82bea,6400...) at sysctl_root+0x187
sysctl_root(c3b82ba4,c3f4d240,c3b82bb0,4,c3b82bea,6400...) at sysctl_root+0x187
userland_sysctl(c3f4d240,c3b82c14,2,0,bfbf3434,...) at userland_sysctl+0x134
__sysctl(c3f4d240,c3b82cfc,18,6,c05d306b,...) at __sysctl+0x94
syscall(c3b82d38) at syscall+0x335
Xint0x80_syscall() at Xint0x80_syscall+0x20
--- syscall (202, FreeBSD ELF32, __sysctl), eip = 0x2815b4cf, esp = 0xbfbfdbac, ebp = 0xbfbfdbdb8 ---
db>
```

PROBLEM CODE PATH

Fig. 9

DETECTING MEMORY CORRUPTION

BACKGROUND

A computing device, such as a personal computer or a network device, may include an operating system (OS) that provides an interface between hardware of the computing device and software processes that are executed by the computing device. The OS may particularly include a kernel, which may be a central component of the OS and may act as a bridge between the software processes and the actual data processing done at the hardware level.

Memory corruption occurs when the contents of a memory location are unintentionally modified due to programming errors. When the corrupted memory contents are used later in a computer program, it may lead to a program crash or unexpected program behavior. Memory corruption in a kernel is difficult to debug because the corruption could be from any code (including third party drivers) and it could affect different data areas during each run. Some debugging tools attempt to detect memory corruption at a point in time after the corruption has occurred (e.g., at the time of free( ) in FreeBSD), at which point the corrupting code context is lost. Other tools can detect memory corruption at the exact moment of corruption, but require a lot of memory (usually a memory page even for 16 byte allocations). This large memory requirement poses problems when trying to debug problems in scaled scenarios where there is insufficient free memory to allow for usage of such tools.

SUMMARY

In one implementation, a method performed by a network device may include configuring, by a processor of the network device, a memory block as a fenced slab that includes multiple data buffers and multiple guard buffers, and assigning, by the processor, a read-only protection to the fenced slab. The method may further include identifying, by the processor, an attempted write access operation, based on a program code instruction, to one of the multiple data buffers or multiple guard buffers; recording, by the processor and in a control register, a faulting address for the attempted write access operation; invoking, by the processor and based on the identifying of the attempted write access operation, a page fault operation; retrieving, by the processor and from the control register, the faulting address; determining, by the processor, whether the faulting address is associated with the fenced slab; determining, by the processor and when the faulting address is associated with the fenced slab, whether the faulting address is an address for one of the multiple data buffers; performing, by the processor and when the faulting address is not an address for one of the multiple data buffers, a panic routine; removing, by the processor and when the faulting address is an address for one of the multiple data buffers, the read-only protection for the fenced slab; and performing, by the processor and when the faulting address is the address for one of the multiple data buffers, a single step processing routine for the program code instruction.

In another implementation, a device may include a memory to store instructions and a processor. The processor may execute instructions in the memory to identify, based on a program code instruction, an attempted write access operation to a fenced memory slab, where the fenced memory slab includes an alternating sequence of data buffers and guard buffers; invoke, based on the attempted write access operation, a page fault operation; perform, when a faulting address of the attempted write operation is not an address for one of the multiple data buffers, a panic routine; and perform, when the faulting address of the attempted write operation is an address for one of the multiple data buffers, a single step processing routine for the program code instruction.

In a further implementation, a computer-readable memory having computer-executable instructions may include one or more instructions to identify, based on a program code instruction, an attempted write access operation to a fenced memory slab, where the fenced memory slab includes an alternating sequence of data buffers and guard buffers; one or more instructions to assign read-only protection to the fenced slab; one or more instructions to invoke, based on the attempted write access operation, a page fault operation; one or more instructions to perform, when a faulting address of the attempted write operation is not an address for one of the multiple data buffers, a panic routine; one or more instructions to remove, when the faulting address of the attempted write operation is an address for one of the multiple data buffers, the read-only protection for the fenced slab; one or more instructions to perform, when the faulting address of the attempted write operation is an address for one of the multiple data buffers, a single step processing routine for the program code instruction; and one or more instructions to re-assign, after the single step processing routine, the read-only protection to the fenced slab.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 7-9 provide illustrations of memory corruption detection according to an implementation described herein.

DETAILED DESCRIPTION

The following detailed description refers to the accompanying drawings. The same reference numbers in different drawings may identify the same or similar elements. Also, the following detailed description does not limit the invention.

Systems and/or methods described herein may provide a debugging tool to detect memory corruption. The systems and/or methods may configure a read-only memory slab (or block) with an alternating sequence of data buffers and guard buffers (referred to herein as a "fenced memory slab" or a "fenced slab"). When a program code instruction causes an attempted write access operation to any address within the fenced memory slab, a page fault operation may be invoked. If a faulting address of the attempted write operation is an invalid address (e.g., not an address for one of the multiple data buffers), a panic routine may be performed to identify the exact program code associated with the page fault. If the faulting address of the attempted write operation is a valid address (e.g., an address for one of the multiple data buffers within the fenced memory slab), the read-only protection for the fenced slab may be removed and a single step processing routine may be performed to provide a debug trace fault.

Implementations described herein are described primarily in the context of enhancing a slab memory allocator (or variations thereof) used in most of the operating system kernels based on x86 instruction set architectures (e.g., Intel 8086 instruction sets and successors). However, in other implementations, other memory allocators and/or architectures (e.g., a memory management unit (MMU)) can be used.

Figure 1:
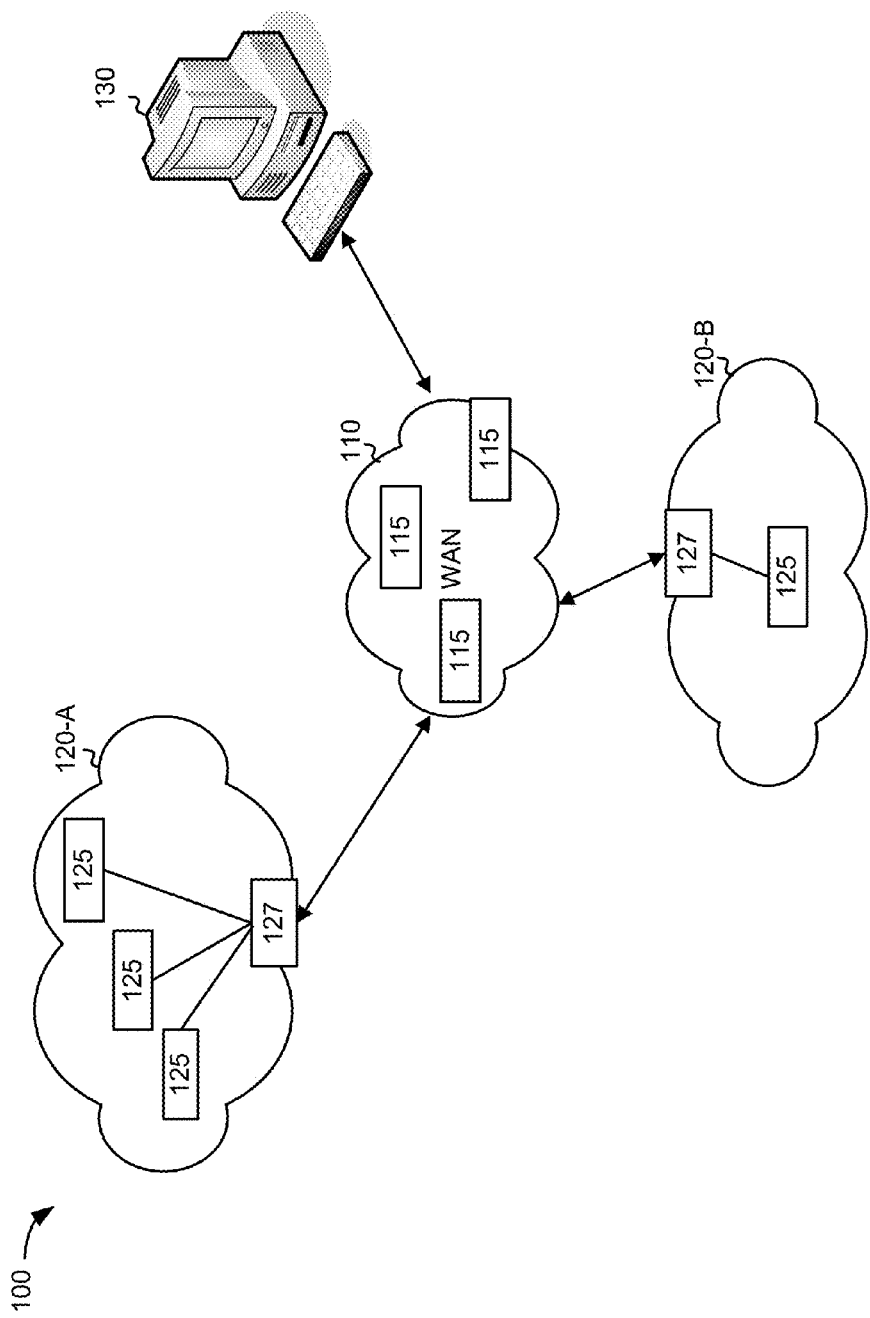
FIG. 1 is a diagram of an example system in which concepts described herein may be implemented.

FIG. 1 is a diagram of an example system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these (or other) networks that are used to transport data. Although shown as a single element in FIG. 1, WAN 110 may include a number of separate networks that function to provide services to private networks 120 and computing devices, such as computing device 130. WAN 110 may be implemented using a number of network devices 115. Network devices 115 may include, for example, routers, switches, gateways, and/or other devices that are used to implement WAN 110.

Private networks 120 may each include a number of computing devices, such as, for example, client computing stations 125 and network devices 127. Client computing stations 125 may include computing devices of end-users, such as desktop computers or laptop computers. Network devices 127, similar to network devices 115, may include network devices used to implement private networks 120. For example, each of network devices 127 may include a data transfer device, such as a router, a gateway, a switch, a firewall, a network interface card (NIC), a hub, a bridge, a proxy server, an optical add-drop multiplexer (OADM), or some other type of device that processes and/or transfers traffic.

Network devices 115 and 127 may each implement a network operating system that controls the resources of the network device and provides an interface to the network device through which users can modify the configuration of the network device.

Computing device 130 may include, for example, a laptop or personal computer connected to WAN 110. Alternatively, computing device 130 may include a mobile communication device, such as a cell phone, etc.

In the example system shown in FIG. 1, one WAN 110, two private networks 120-A and 120-B, and one computing device 130 are shown. In other implementations, system 100 may include fewer devices, different devices, differently arranged devices, and/or additional devices than those depicted in FIG. 1. Alternatively, or additionally, one or more devices of system 100 may perform one or more other tasks described as being performed by one or more other devices of system 100.

Figure 2:
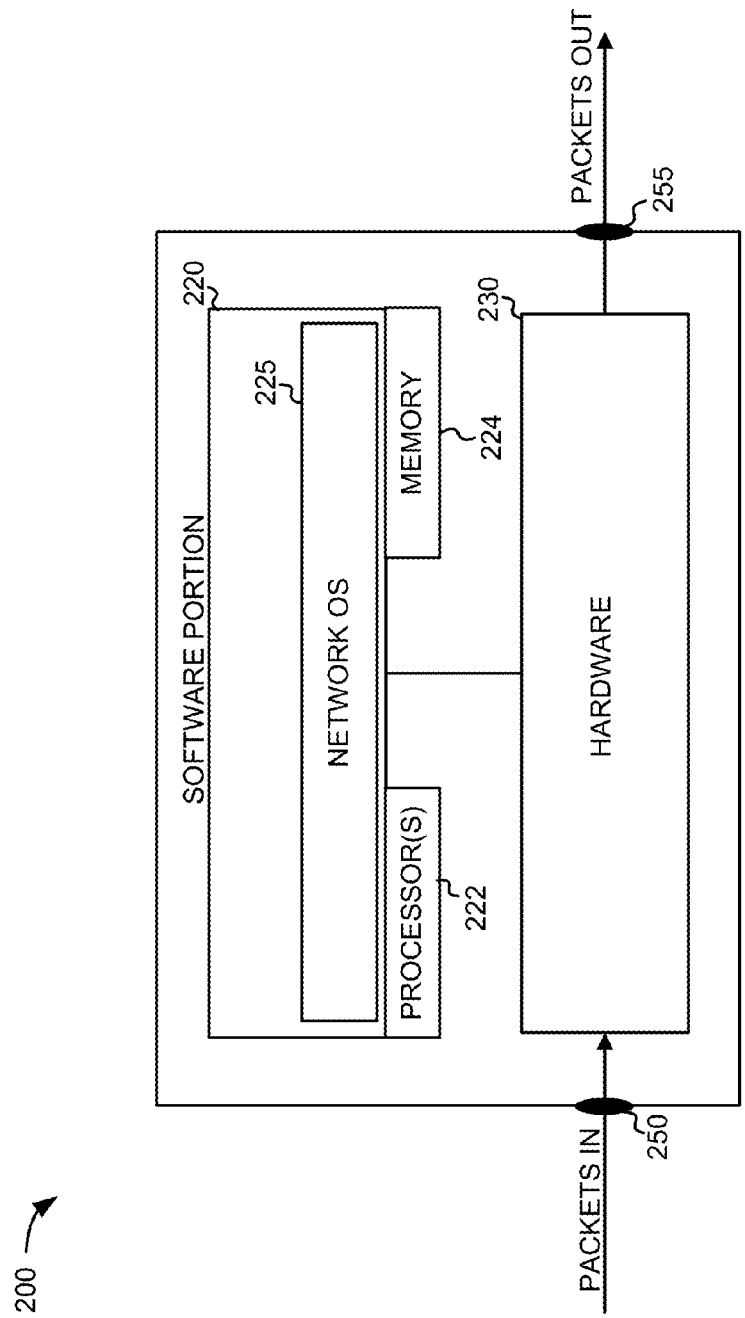
FIG. 2 is a block diagram of components of an example network device shown in FIG. 1.

FIG. 2 is a block diagram of an example network device 200, which may correspond to one of network devices 115 or 127. In order to increase throughput, network device 200 may use dedicated hardware to assist in processing incoming units of data, such as packets. In some alternative implementations, units of data (data units) other than packets may be used. As shown in FIG. 2, network device 200 may generally include a software portion 220 and a hardware portion 230.

Software portion 220 may include software designed to control network device 200. Software portion 220 may particularly include a network operating system (OS) 225. For example, network operating system 225 may control hardware portion 230 and may provide an interface for user configuration of network device 200. In general, software portion 220 may implement the functions of network device 200 that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). When network device 200 is a router, hardware portion 230 may, for example, receive incoming packets, extract header information for the packets, and process the packets based on the extracted header information. When network device 200 is a firewall, hardware portion 230 may, for example, receive incoming packets, extract header information from the packets, and match portions of the header information to a lookup table, such as one stored in a ternary CAM, to determine whether the packet should be dropped.

Network device 200 may additionally include one or more input ports 250 for receiving incoming packets and one or more output ports 255 for transmitting an outgoing packet. In some implementations, a port may act as both or one of an input port 250 or an output port 255. Ports 250/255 may also be used to receive remote user connections for configuring the operation of network device 200.

Although FIG. 2 shows example components of network device 200, in other implementations, network device 200 may include fewer components, different components, differently arranged components, or additional components than depicted in FIG. 2. Alternatively, or additionally, one or more components of network device 200 may perform one or more other tasks described as being performed by one or more other components of network device 200.

Figure 3:
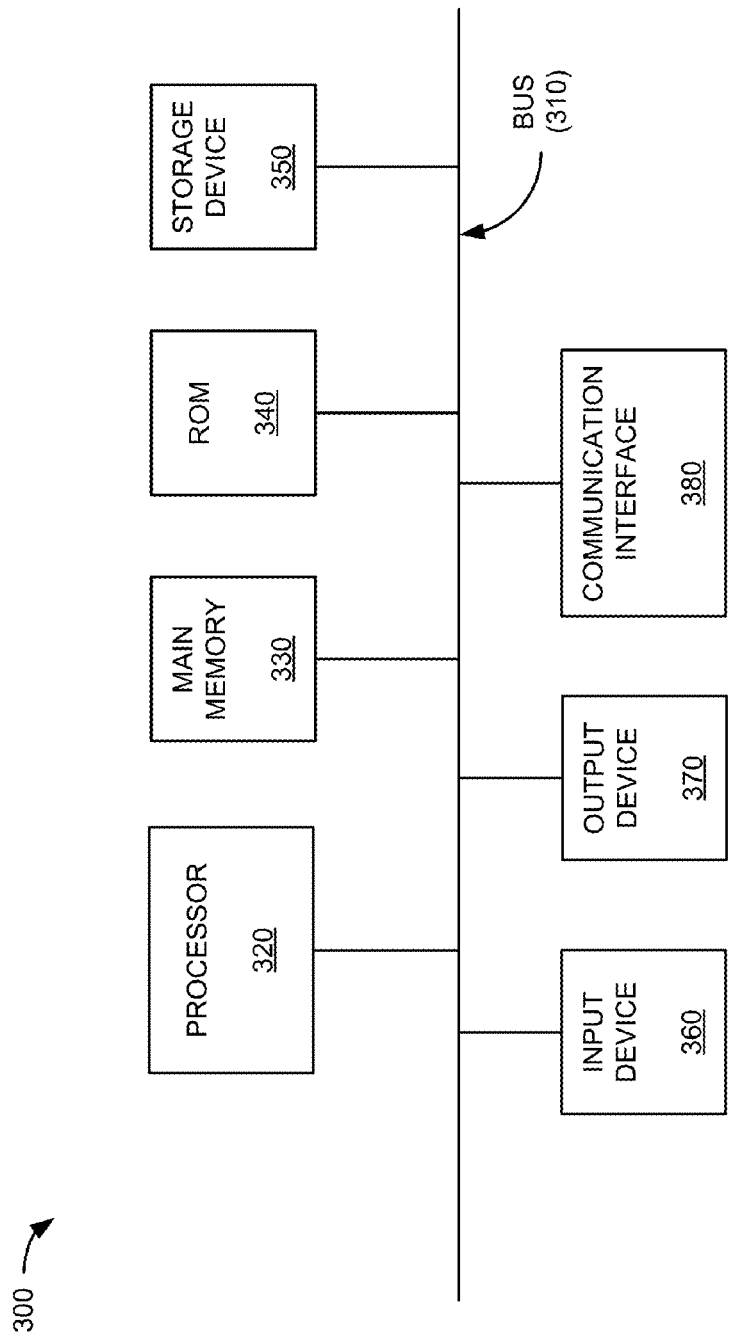
FIG. 3 is a diagram of example components of a computing device shown in FIG. 1.

FIG. 3 is a diagram of example components of a computing device 300, which may correspond to one of client computing stations 125 or computing device 130. As shown in FIG. 3, computing device 300 may include a bus 310, a processor 320, a main memory 330, a read only memory (ROM) 340, a storage device 350, an input device 360, an output device 370, and a communication interface 380. Bus 310 may include a path that permits communication among the elements of the device.

Processor 320 may include a processor, microprocessor, or processing logic (e.g., an ASIC or a FPGA) that may interpret and execute instructions. Main memory 330 may include a RAM or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the device, such as a keyboard, a mouse, a pen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the device to communicate with other devices and/or systems.

As will be described in detail below, computing device 130 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as data storage device 350, or from another device via communication interface 380. The software instructions contained in main memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of computing device 300, in other implementations, computing device 300 may include fewer components, different components, differently arranged components, or additional components than depicted in FIG. 3. Alternatively, or additionally, one or more components of computing device 300 may perform one or more other tasks described as being performed by one or more other components of computing device 300.

Figure 4:
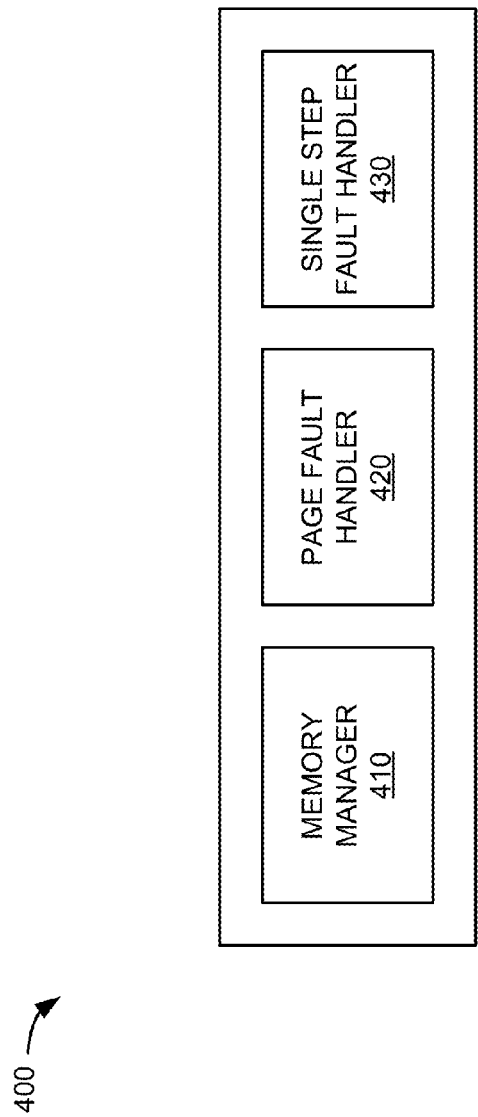
FIG. 4 is a diagram illustrating example functional components of the network device or the computing device of FIG. 1.

FIG. 4 is a block diagram of example functional components of a device 400 that may correspond to network device 115, client computing device 125, network device 127, and/or computing device 130. In one implementation, the functions described in connection with FIG. 4 may be performed by one or more components of network device 200 (FIG. 2) or computing device 300 (FIG. 3). As illustrated, device 400 may include a memory manager 410, a page fault handler 420, and a single step fault handler 430. In one implementation, memory manager 410, page fault handler 420, and single step fault handler 430 may be included with an operating system (e.g., operating system 222) of device 400.

Memory manager 410 may include hardware or a combination of hardware and software to configure slab memory for device 400 and to detect invalid memory operations. In one implementation, slab memory may be configured as either an un-fenced (e.g., typical) slab or a fenced slab. Based on instructions from, for example, an operator, memory allocator 410 may assign, to a slab, appropriate values in a page table entry corresponding to a particular memory location. The page table entry may represent a physical address of a page in memory and a particular offset into the page. The page table entry may also indicate permissions (e.g., read-only access, read/write access, etc.) for a particular slab. Slab memory configurations are described further in connection with FIG. 5.

Figure 5:
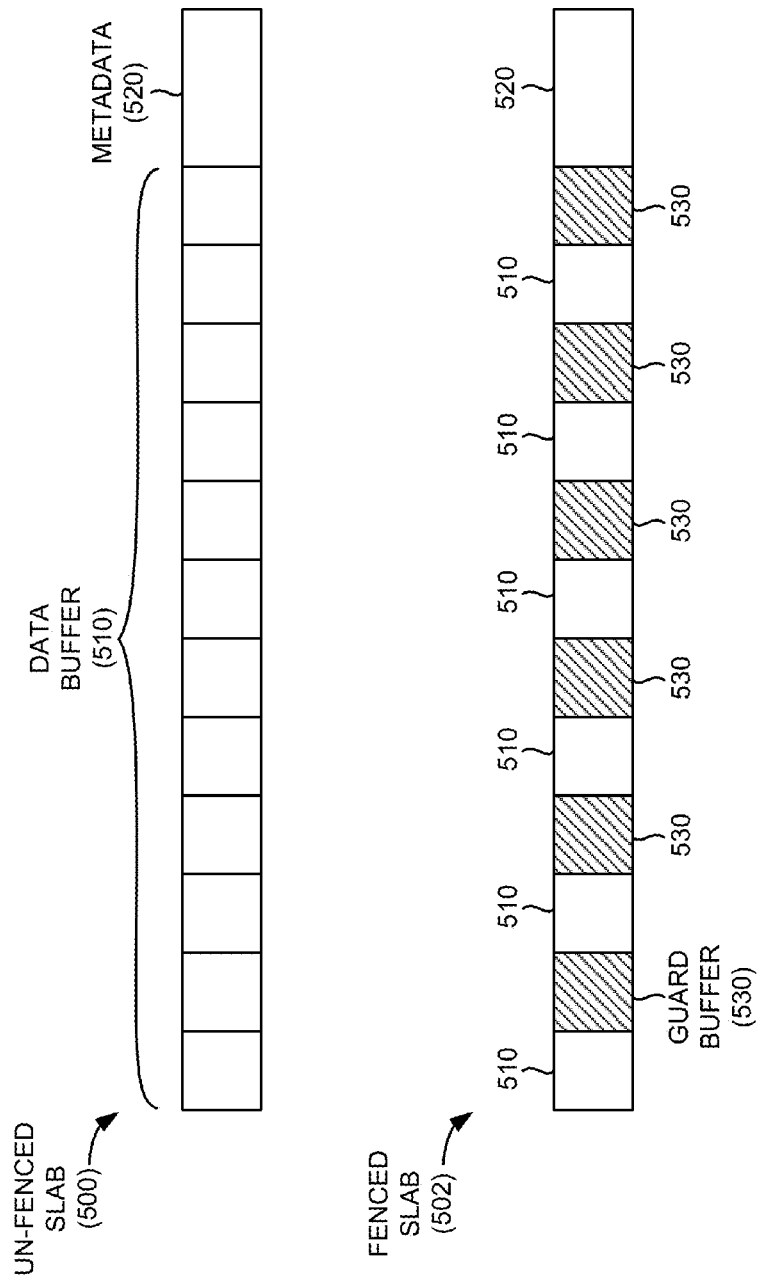
FIG. 5 is diagram illustrating an example data structure for a slab memory.

FIG. 5 provides a diagram of slab memory configurations according to an implementation described herein. As shown in FIG. 5, slab memory component configurations may include an un-fenced slab 500 and a fenced slab 502. In implementations described herein, a zone (e.g., a portion of memory) may be configured as one of un-fenced slab 500 or a fenced slab 502. Fenced slab 502 may be configured, for example, to perform error detection for particular code.

Un-fenced slab 500 may represent a contiguous portion of memory (e.g. memory 224 or main memory 330) that may include one or more physically contiguous pages. Un-fenced slab 500 may include multiple data buffers 510 and an on-page slab metadata portion 520. Data buffers 510 may include space to store objects assigned by an OS kernel. On-page slab metadata portion 520 may include information needed to retain the slab, such as a slab header. In one implementation, each of data buffers 510 may be of equal size, and the number of data buffers may be sufficient to fill a one page (e.g., while leaving sufficient space for meta data portion 520.) Un-fenced slab 500 may be configured with read/write access based on, for example, an entry in page table that corresponds to unfenced slab 500.

Fenced slab 502 may represent another contiguous portion of memory (e.g. memory 224 or main memory 330) that may include one or more physically contiguous pages. Fenced slab 502 may include multiple data buffers 510, multiple guard buffers 530, and on-page slab metadata portion 520. More particularly, a guard buffer 530 may be placed after each data buffer 510. Guard buffer 530 may include a portion of memory to which no data may be written. In one implementation, a size of guard buffer 530 may be equal to that of data buffer 510. Fenced slab 502 may be protected from write access by setting the appropriate values in the page table entry corresponding to fenced slab 502. Thus, whenever a kernel invokes a write access to fenced slab 502, a page fault (or protection fault) routine may be invoked, regardless of whether the write access is actually valid or invalid.

Although FIG. 5 shows example arrangement of un-fenced slab 500 and fenced slab 502, in other implementations, un-fenced slab 500 and fenced slab 502 may be arranged differently than depicted in FIG. 5.

Referring back to FIG. 4, memory manager 410 may interrupt execution of a software program when the software program attempts to access pages that are not present in RAM or pages that do not conform to the permission attributes for a given page. For example, if a write operation is attempted for fenced slab 502, memory manager 410 may invoke a page fault. When a page fault interruption occurs, memory manager 410 may store a page fault linear address in a control register (e.g., a CR2). Memory manager 410 may invoke page fault handler 420 to resolve the memory access problem.

Page fault handler 420 may include hardware or a combination of hardware and software to identify and resolve page faults received from memory manager 410. In one implementation, page fault handler 420 may access the control register to identify a page fault linear address associated with the page fault. If the page fault linear address corresponds to one of un-fenced slabs 500, page fault handler 420 may perform typical page fault operations to either resolve or report the page fault.

If the page fault linear address corresponds to one of fenced slabs 502, page fault handler 420 may invoke steps to detect the point of the page fault. Page fault handler 420 may first determine whether the write operation associated with the page fault linear address is within a correct offset. A correct offset may be considered an offset from the page which falls in one of data buffers 510 and not in metadata portion 520 or one of guard buffers 530. Identification of an invalid offset may cause page fault handler 420 to invoke a panic routine. For example, if a write operation to one of guard buffers 530 occurs, page fault handler 420 may immediately default to a panic routine to identify corrupting code. The panic routine (or kernel panic) may generally output an error message to a console and/or dump an image of kernel memory to disk for purposes of debugging. The panic routine may wait for the system to be manually rebooted or initiate an automatic reboot.

If a write operation to one of buffers 510 (e.g., of fenced slab 502) occurs, then page fault handler 420 may enable write access for fenced slab 502 (e.g., by modifying the appropriate values in the page table entry) and may invoke a single step processing routine. In one implementation, the single step processing routine may be performed by invoking single step fault handler 430.

Single step fault handler 430 may include hardware or a combination of hardware and software to identify particular instructions that may have resulted in a particular page fault. For example, after write access is enabled for fenced slab 502, the instruction of the application (e.g., the instruction that triggered the page fault) may be restarted by single step fault handler 430. For example, single step fault handler 430 may step through the individual instruction(s) of the application program, may monitor how the processor (e.g., processor 222 or 320) state changes after each instruction, and may identify errors based on the changes in the processor state. Thus, single step fault handler 430 may execute the application instruction without a page fault, but will generate a debug trace fault after executing the instruction. As part of the debug trace fault, single step fault handler 430 may remove write access (e.g., by modifying the appropriate values in the page table entry) for fenced slab 502 so that future write operations would again trigger a page fault.

Although FIG. 4 shows example functional components of device 400, in other implementations, device 400 may include fewer functional components, different functional components, differently arranged functional components, or additional functional components than depicted in FIG. 4. Alternatively, or additionally, one or more functional components of device 400 may perform one or more other tasks described as being performed by one or more other components of device 400.

Figure 6:
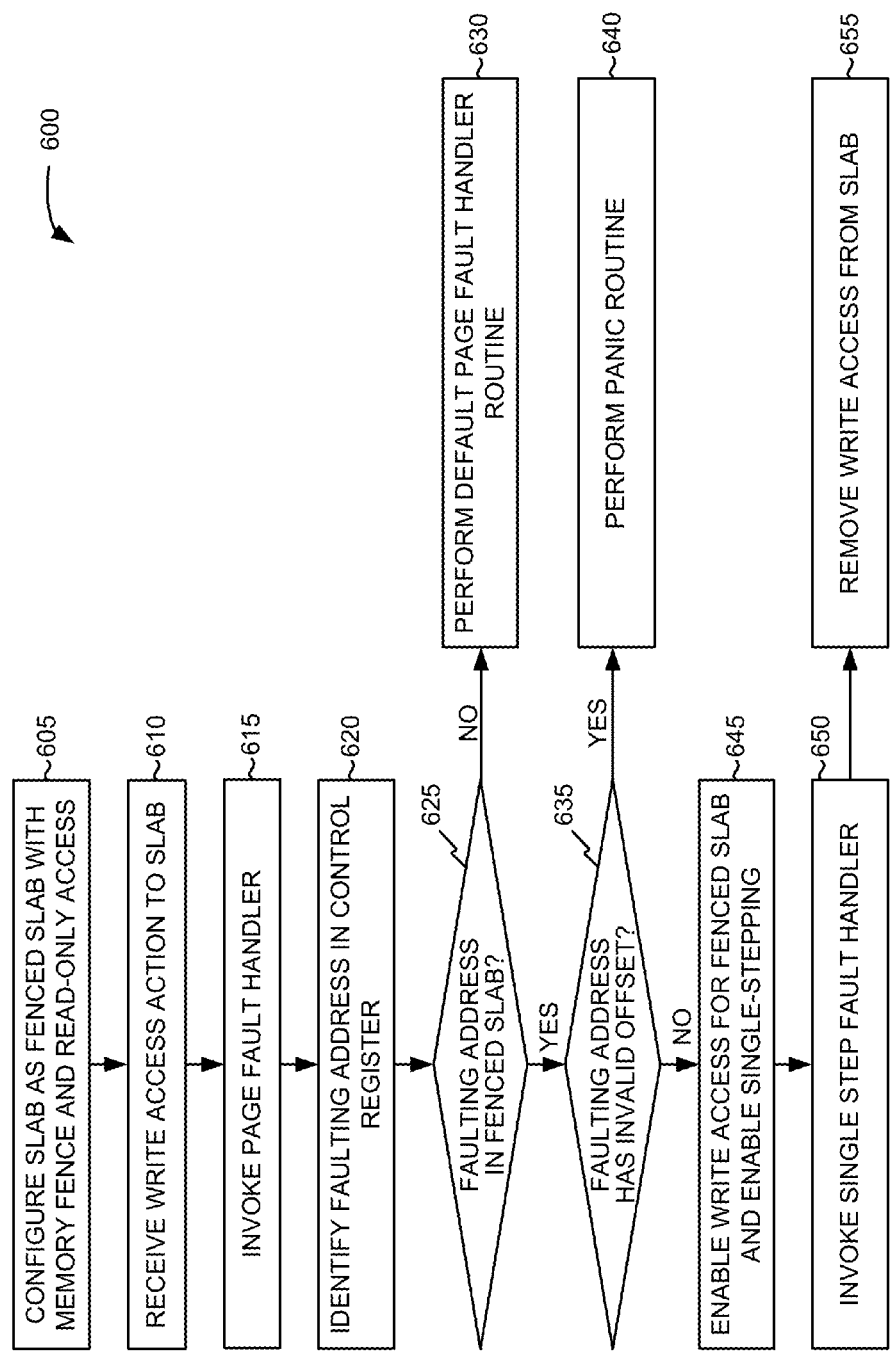
FIG. 6 is a flow diagram illustrating an example process for detecting memory corruption according to an implementation described herein.

FIG. 6 is a flow diagram illustrating an example process 600 for detecting memory corruption in a kernel according to an implementation described herein. In one implementation, process 600 may be performed by device 400. In another implementation, process 600 may be performed by another device or group of devices including or excluding device 400.

Process 600 may include configuring a slab as fenced slab with a memory fence and read-only access (block 605). For example, as described above in connection with FIGS. 4 and 5, slab memory may be configured as either un-fenced slab 500 or fenced slab 502. Based on instructions from, for example, an operator, memory allocator 410 may assign, to a slab, appropriate values in a page table entry corresponding to a particular memory location. The page table entry may also indicate permissions (e.g., read-only access, read/write access, etc.) for a particular slab. Fenced slab 502 may represent a contiguous portion of memory (e.g. memory 224 or main memory 330) that may include one or more physically contiguous pages. Fenced slab 502 may include multiple data buffers 510 with a guard buffer 530 after each data buffer 510. The size of guard buffer 530 may be equal to that of data buffer 510. Fenced slab 502 may be protected from write access by setting the appropriate values in the page table entry corresponding to fenced slab 502. Thus, whenever a kernel invokes a write access to fenced slab 502, a page fault (or protection fault) routine may be invoked, regardless of whether the write access is actually valid or invalid.

A write action to the slab may be received (block 610), a page fault handler may be invoked (block 615), and a faulting address may be identified in a control register (block 620). For example, as described above in connection with FIGS. 4 and 5, fenced slab 502 may be protected from write access by setting the appropriate values in the page table entry corresponding to fenced slab 502. Thus, whenever an application instruction invokes a write access to fenced slab 502, a page fault (or protection fault) routine may be invoked, regardless of whether the write access is actually valid or invalid. Memory manager 410 may interrupt execution of a software program when the software program attempts a write operation for fenced slab 502. When a page fault interruption occurs, memory manager 410 may store a page fault linear address in a control register. Memory manager 410 may then invoke page fault handler 420 to resolve the memory access problem.

Referring back to FIG. 6, it may be determined if the faulting address is within the fenced slab (block 625). If the faulting address is not within the fenced slab (block 625—NO), a default page fault handler routine may be performed (block 630). For example, as described above in connection with FIG. 4, page fault handler 420 may access the control register to identify a page fault linear address associated with the page fault. If the page fault linear address corresponds to one of un-fenced slabs 500, page fault handler 420 may perform typical page fault operations to either resolve or report the page fault.

If the faulting address is within the fenced slab (block 625—YES), it may be determined if the faulting address has an invalid offset (block 635). If the faulting address has an invalid offset (block 635—YES), a panic routine may be performed (block 640). For example, as described above in connection with FIG. 4, page fault handler 420 may determine whether a write operation associated with a page fault linear address is within a correct offset. Identification of an invalid offset may cause page fault handler 420 to invoke a panic routine. For example, if a write operation to one of guard buffers 530 occurs, page fault handler 420 may immediately default to a panic routine to identify corrupting code. The panic routine (or kernel panic) may generally output an error message to a console and/or dump an image of kernel memory to disk for purposes of debugging. The panic routine may wait for the system to be manually rebooted or initiate an automatic reboot.

If the faulting address does not have an invalid offset (block 635—NO), write access for the fenced slab may be enabled and single-stepping may be enabled (block 645), a single step fault handler may be invoked (block 650), and write access may be removed from the fenced slab (block 655). For example, as described above in connection with FIG. 4, if a write operation to one of buffers 510 (e.g., of fenced slab 502) occurs, then page fault handler 420 may enable write access for fenced slab 502 (e.g., by modifying the appropriate values in the page table entry) and may invoke a single step processing routine. In one implementation, the single step processing routine may be performed by invoking single step fault handler 430. Single step fault handler 430 may restart the instruction that triggered the page fault. For example, single step fault handler 430 may step through the individual instruction(s) of the application program, may monitor how the processor (e.g., processor 222 or 320) state changes after each instruction, and may identify errors based on the changes in the processor state. Thus, single step fault handler 430 may execute the application instruction without a page fault and may generate a debug trace fault after executing the instruction. As part of the debug trace fault, single step fault handler 430 may remove write access (e.g., by modifying the appropriate values in the page table entry) for fenced slab 502 so that future write operations would again trigger a page fault.

Figure 7:

FIGS. 7-9 provide illustrations of memory corruption detection according to an implementation described herein. FIG. 7 provides an example code section 700 that includes instructions designed to cause memory corruption for a fenced slab. FIG. 8 is an example screen shot of a section 800 of a test output using code section 700. Section 800 shows that access for a first 128 elements (e.g. 0-127) was allowed and that access to an invalid element (128) caused a panic. Referring to FIG. 9, use of a backtrace ("bt") command reveals the particular problematic code path.

In the systems and/or methods described herein, a memory slab may be configured as a read-only fenced slab that includes multiple data buffers and multiple guard buffers. Write operations, based on program code instructions, to any address in the fenced slab may invoke a page fault. Once a page fault is invoked, the page fault handler may identify a particular faulting address and associate the faulting address with the fenced slab. If the faulting address is a valid address (e.g., for a data buffer), the page fault handler may temporarily remove read-only protection for the fenced slab and invoke a single step fault handler to execute the program code instruction. If the faulting address is an invalid address (e.g., for a guard buffer), the page fault handler may invoke a panic function.

The systems and/or methods described herein may provide for immediate detection of memory corruption and/or buffer overflow. The systems and/or methods described herein may be implemented without changes to existing memory alignment and access patterns, but may use less memory than existing techniques.

The foregoing description of example implementations provides illustration and description, but is not intended to be exhaustive or to limit the invention to the precise form disclosed. Modifications and variations are possible in light of the above teachings or may be acquired from practice of the invention.

For example, while a series of blocks has been described with respect to FIG. 6, the order of the blocks may be varied in other implementations. Moreover, non-dependent blocks may be implemented in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as a "component" that performs one or more functions. This component may include hardware, such as a processor, microprocessor, an application specific integrated circuit, or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a network device, the method comprising:
   configuring, by a processor of the network device, a memory block as a fenced slab that includes multiple data buffers and multiple guard buffers;
   assigning, by the processor, a read-only protection to the fenced slab;
   identifying, by the processor, an attempted write access operation, based on a program code instruction, to one of the multiple data buffers or multiple guard buffers;
   recording, by the processor and in a control register, a faulting address for the attempted write access operation;
   invoking, by the processor and based on the identifying the attempted write access operation, a page fault operation;
   retrieving, by the processor and from the control register, the faulting address;
   determining, by the processor, whether the faulting address is associated with the fenced slab;
   determining, by the processor and when the faulting address is associated with the fenced slab, whether the faulting address is an address for one of the multiple data buffers;
   performing, by the processor and when the faulting address is not an address for one of the multiple data buffers, a panic routine;
   removing, by the processor and when the faulting address is an address for one of the multiple data buffers, the read-only protection for the fenced slab; and
   performing, by the processor and when the faulting address is the address for one of the multiple data buffers, a single step processing routine for the program code instruction.

2. The method of claim 1, further comprising:
   re-assigning, after performing the single step processing routine, the read-only protection to the fenced slab.

3. The method of claim 1, where the slab includes a contiguous portion of memory and where each of the multiple data buffers is followed by one of the multiple guard buffers.

4. The method of claim 1, where each of the multiple guard buffers is the same size as each of the multiple data buffers.

5. The method of claim 1, where the panic routine identifies the program code instruction associated with the faulting address.

6. The method of claim 1, where assigning the read-only protection to the fenced slab includes:
   assigning a value in a page table entry corresponding to a location of the memory slab.

7. The method of claim 1, where performing the panic routine occurs when the faulting address is an address for one of the multiple guard buffers or an on-page slab metadata portion of the memory slab.

8. A device, comprising:
a memory to store a plurality of instructions; and
a processor to execute instructions in the memory to:
- identify, based on a program code instruction, an attempted write access operation to a fenced memory slab, where the fenced memory slab includes an alternating sequence of data buffers and guard buffers;
- invoke, based on the attempted write access operation, a page fault operation;
- perform, when a faulting address of the attempted write operation is not an address for one of the multiple data buffers, a panic routine; and
- perform, when the faulting address of the attempted write operation is an address for one of the multiple data buffers, a single step processing routine for the program code instruction.

9. The device of claim 8, where the processor is further to execute instructions in the memory to:
- assign, before the attempted write access operation, read-only protection to the fenced slab;
- remove, when the faulting address of the attempted write operation is an address for one of the multiple data buffers, the read-only protection for the fenced slab; and
- re-assign, after the single step processing routine, the read-only protection to the fenced slab.

10. The device of claim 9, where the read-only access is assigned using a page table entry corresponding to a location of the memory slab.

11. The device of claim 8, where the processor is further to execute instructions in the memory to:
- store, in a control register, the faulting address for the attempted write access operation.

12. The device of claim 8, where the slab includes a contiguous portion of the memory.

13. The device of claim 8, where each of the multiple guard buffers is the same size as each of the multiple data buffers.

14. The device of claim 8, where the panic routine identifies a program code instruction associated with the attempted write access operation.

15. The device of claim 8, where the memory slab further includes an on-page slab metadata portion, and where performing the panic routine occurs when the faulting address of the attempted write operation is an address for one of the multiple guard buffers or the on-page slab metadata portion.

16. The device of claim 8, where the device comprises one or more of:
- a router,
- a switch,
- a gateway,
- a firewall,
- a network interface card (NIC),
- a hub,
- a bridge,
- a proxy server, or
- an optical add-drop multiplexer (OADM).

17. A non-transitory computer-readable memory comprising computer-executable instructions, the computer-readable memory comprising:
- one or more instructions to identify, based on a program code instruction, an attempted write access operation to a fenced memory slab, where the fenced memory slab includes an alternating sequence of data buffers and guard buffers;
- one or more instructions to assign read-only protection to the fenced slab;
- one or more instructions to invoke, based on the attempted write access operation, a page fault operation;
- one or more instructions to perform, when a faulting address of the attempted write operation is not an address for one of the data buffers, a panic routine;
- one or more instructions to remove, when the faulting address of the attempted write operation is an address for one of the data buffers, the read-only protection for the fenced slab;
- one or more instructions to perform, when the faulting address of the attempted write operation is an address for one of the data buffers, a single step processing routine for the program code instruction; and
- one or more instructions to re-assign, after the single step processing routine, the read-only protection to the fenced slab.

18. The non-transitory computer-readable memory of claim 17, further comprising:
- one or more instructions to store, in a control register, the faulting address for the attempted write access operation.

19. The non-transitory computer-readable memory of claim 17, where the single step processing routine generates a debug trace fault.

20. The non-transitory computer-readable memory of claim 17, where the panic routine identifies a program code instruction associated with the attempted write access operation.

* * * * *